United States Patent
Huang

(10) Patent No.: US 8,977,081 B2
(45) Date of Patent: Mar. 10, 2015

(54) POLARIZATION SPLITTER OF HIGH POLARIZATION EXTINCTION RATIO

(71) Applicant: Hon Hai Precision Industry Co., Ltd., New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/923,287

(22) Filed: Jun. 20, 2013

(65) Prior Publication Data

US 2014/0219601 A1    Aug. 7, 2014

(30) Foreign Application Priority Data

Feb. 4, 2013 (TW) .............................. 102104221 U

(51) Int. Cl.
*G02B 6/26* (2006.01)
*G02B 6/126* (2006.01)
*G02B 6/293* (2006.01)

(52) U.S. Cl.
CPC ............ *G02B 6/126* (2013.01); *G02B 6/29344* (2013.01)
USPC ............................................. 385/29; 385/45

(58) Field of Classification Search
CPC ....... G02B 6/29344; G02B 6/276; G02B 6/27
USPC ..................................................... 385/29, 45
See application file for complete search history.

(56) References Cited

U.S. PATENT DOCUMENTS

| 4,384,760 | A | * | 5/1983 | Alferness | 385/11 |
| 4,943,131 | A | * | 7/1990 | Taki | 385/29 |
| 5,127,081 | A | * | 6/1992 | Koren et al. | 385/130 |
| 5,146,518 | A | * | 9/1992 | Mak et al. | 385/41 |
| 5,151,957 | A | * | 9/1992 | Riviere | 385/41 |
| 5,481,636 | A | * | 1/1996 | Fukuda et al. | 385/122 |
| 5,887,089 | A | * | 3/1999 | Deacon et al. | 385/22 |
| 8,244,082 | B2 | * | 8/2012 | Pacher et al. | 385/15 |
| 8,498,503 | B2 | * | 7/2013 | Mary et al. | 385/11 |

* cited by examiner

*Primary Examiner* — Charlie Y Peng
(74) *Attorney, Agent, or Firm* — Novak Druce Connolly Bove + Quigg LLP

(57) ABSTRACT

A polarization splitter includes a substrate, an asymmetric Y-shaped waveguide, and a pair of strip-shaped electrodes. The substrate is made of a birefringence crystal and includes a surface. The Y-shaped waveguide is formed into the surface and includes an input section for transmitting both transverse electric wave and transverse magnetic wave, a first branch for only transmitting the transverse electric wave, and a second branch for only transmitting the transverse magnetic wave. The first branch and the second branch branch off the input section. The electrodes are positioned on the surface, arranged at two opposite sides of the input section and substantially parallel with a central axis of the input section.

8 Claims, 4 Drawing Sheets

POLARIZATION SPLITTER OF HIGH POLARIZATION EXTINCTION RATIO

BACKGROUND

1. Technical Field

The present disclosure relates to integrated optics and, more particularly, to a polarization splitter having a relatively high polarization extinction ratio.

2. Description of Related Art

Polarization splitters are used in integrated optics to separate transverse electric wave and transverse magnetic wave. However, polarization extinction ratios of current polarization splitters are often less than satisfactory.

Therefore, it is desirable to provide a polarization splitter, which can overcome the above-mentioned problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
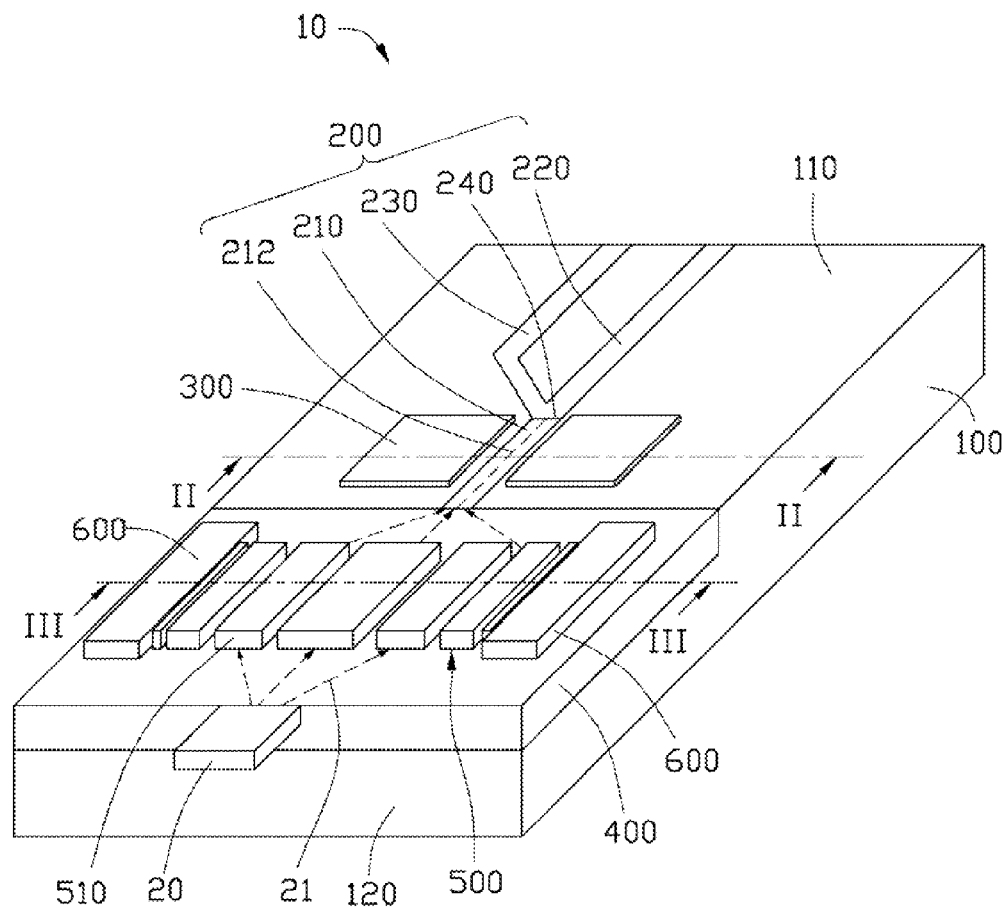
FIG. 1 is an isometric schematic view of a polarization splitter, according to an embodiment.
Figure 2:
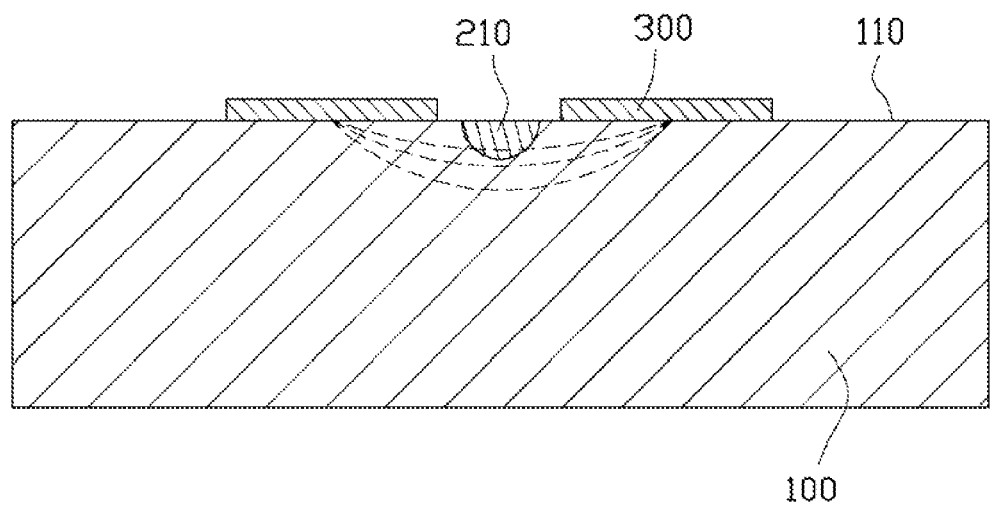
FIG. 2 is a cross-sectional view taken along a line II-II of FIG. 1.

FIGS. 1 and 2 show a polarization splitter 10 according to an embodiment. The polarization splitter 10 includes a substrate 100, an asymmetric Y-shaped waveguide 200, and a pair of strip-shaped first electrodes 300. The substrate 100 is made of a birefringence crystal, such as lithium niobate, and includes a first surface 110, such as a top surface. The Y-shaped waveguide 200 is formed into the first surface 110 and includes an input section 210 for transmitting both transverse electric wave and transverse magnetic wave, a first branch 220 for only transmitting the transverse electric wave, and a second branch 230 for only transmitting the transverse magnetic wave. The first branch 220 and the second branch 230 branch off the input section 210. An interface 240 is formed between the input section 210 and the first branch 220 and the second branch 230. The first electrodes 300 are positioned on the first surface 110, arranged at two opposite sides of the input section 210 and substantially in parallel with a central axis 212 of the input section 210.

Due to the birefringence effect, the transverse magnetic wave and the transverse electric wave traversing in the input section 210 separate when passing through the interface 240 and enter into the first branch 220 and the second branch 230, respectively. Electric field generated by the first electrodes 300 change a refractive index of the input section 210 along a direction that is substantially perpendicular to a central axis of the input section 210. As such, a phase change of the transverse electric wave is greater than a phase change of the transverse magnetic wave, which facilitates the separation of the transverse electric wave from the transverse magnetic wave and increases a polarization extinction ratio of the polarization splitter 10.

In this embodiment, the substrate 100 is substantially rectangular and is made of lithium niobate to increase a bandwidth of the polarization splitter 10 as the lithium niobate has a relative higher response speed.

The first branch 220 and the input section 210 lie in a common straight line. The second branch 230 forms an included angle with the input section 210 at an intersection therebetween.

The input section 210, the first branch 220, and the second branch 230 are made by diffusing titanium, gallium, and zinc-nickel into the first surface 110 by, for example, a high temperature diffusing technology, respectively.

Each of the first electrodes 300 is as long as or slightly shorter than the input section 210 and aligns with the input section 210. The first electrodes 300 can be formed by, for example, coating metal such as copper on the first surface 110.

Figure 3:
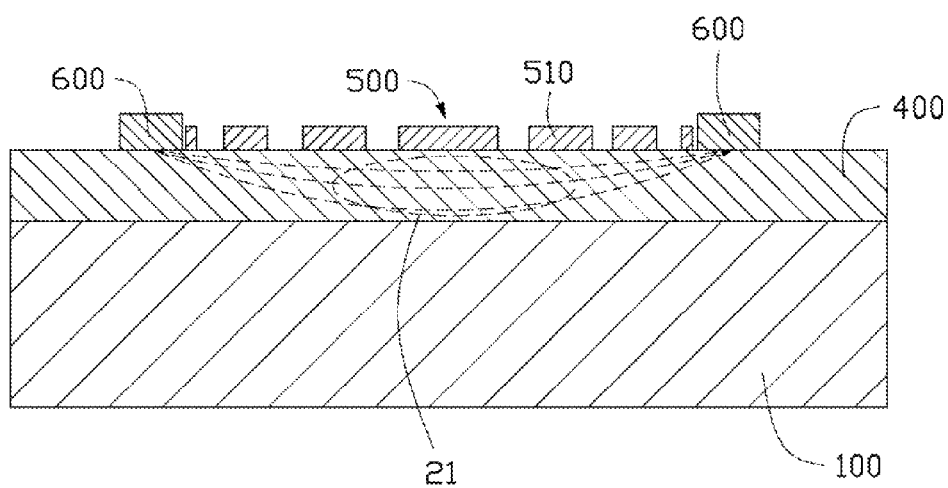
FIG. 3 is a cross-sectional view taken along a line III-III of FIG. 1.

Also referring to FIG. 3, the polarization splitter 10 further includes a planar waveguide 400, a media grating 500, and a pair of strip-shaped second electrodes 600. The planar waveguide 400 is formed into the first surface 110 and connects an end of the input section 210 opposite to the first branch 220. The planar waveguide 400 is configured to receive a laser beam 21 traversing substantially along the central axis 212 and toward the input section 210. The media grating 500 is formed on the planar waveguide 400 and is symmetrical about the central axis 212. The second electrodes 600 are positioned on the planar waveguide 400, at two opposite sides of the media grating 500 and substantially in parallel with the central axis 212.

As such, the planar waveguide 400 and the media grating 500 cooperatively constitute a diffractive waveguide lens to converge the laser beam 21 into the input section 210. Electric fields generated by the second electrodes 600 change a refractive index of the planar waveguide 400 along a direction that is substantially perpendicular to the central axis 212, and thus change a focal length of the waveguide lens. Thus, an amount/power of the laser beam 21 that enters into the input section 210 can be adjusted by adjusting the focal length of the waveguide lens to affect the convergence of the laser beam 21 at the entrance of the input section 210.

The substrate 100 includes a second surface 120, such as a side surface, perpendicularly connecting the first surface 110 and substantially perpendicular to the central axis 212. The planar waveguide 400 is formed by coating titanium on the first surface 110 by, for example, sputtering, and then diffusing the titanium into the substrate 100 by, for example, a high temperature diffusing technology. That is, the planar waveguide 400 is made of lithium niobate diffused with titanium, of which an effective refractive index gradually changes when media-loaded. The planar waveguide 400 extends from the input section 210 to the second surface 120. The laser beam 21 is emitted by a laser light source 20. The laser light source 20 is a distributed feedback laser, and is attached to a part of the second surface 120 that corresponds to the planar waveguide 400 and aligns with the entrance of the input section 210 by, for example, a die bond technology.

FIG. 3 shows that the first media grating 500 can be a chirped grating and has an odd number of first media strips 510. The first media strips 510 are symmetrical about the central axis 212. Each of the first media strips 510 is rectangular and parallel with each other. In order from a widthwise center to each widthwise side, widths of the first media strips 510 decreases, and widths of gaps between each two adjacent first media strips 510 also decreases.

Figure 4:
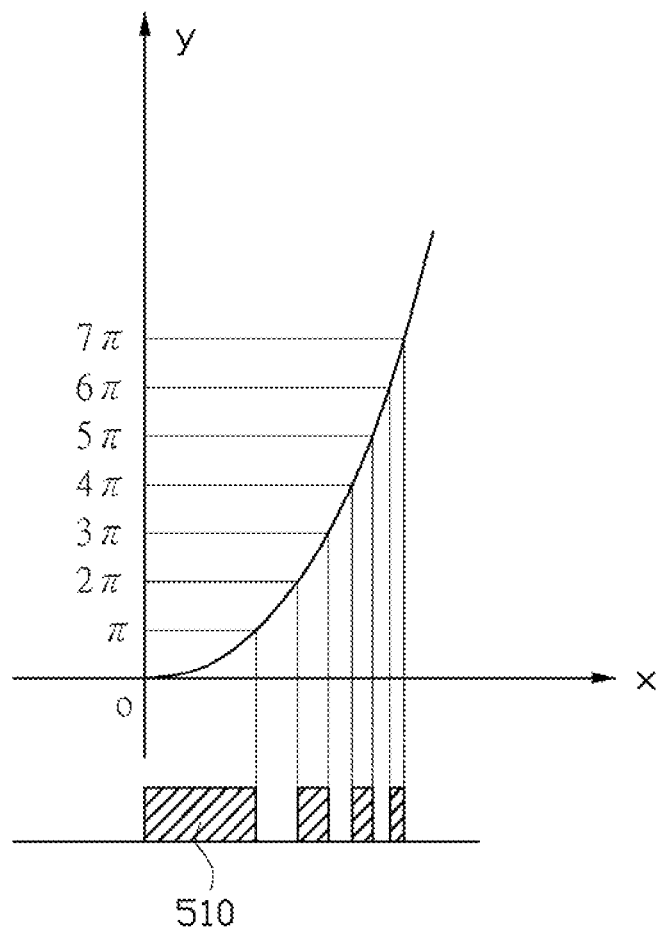
FIG. 4 is a schematic view of a media grating of the polarization splitter of FIG. 1.

FIG. 4 shows that a coordinate system "oxy" is established, wherein the origin "o" is an intersection point of the central axis 212 and a widthwise direction of the planar waveguide 400, "x" axis is the widthwise direction of the planar waveguide 400, and "y" axis is a phase shift of the laser beam 21 at a point "x". According to wave theory of planar waveguides, the phase shift of the laser beam 21 satisfies the formula: $y=a(1-e^{kx^2})$, wherein x>0, a, e, k are constants. In this embodiment, boundaries of the first media strips 510 are set to conform to conditions of formulae: $y_n = a(1-e^{kx_n^2})$ and $y_n = n\pi$, wherein $x_n$ is the nth boundary of the first media strips 510 along the "x" axis, and $y_n$ is the corresponding phase shift. That is, $$x_n = \sqrt{\frac{\ln\left(1 - \frac{n\pi}{a}\right)}{k}} \quad (x_n > 0).$$

The boundaries of the first media strips 510 where $x_n<0$ can be determined by characteristics of symmetry of the first media grating 500.

The media grating 500 can be formed by coating high-refractive material, such as dioxide silicon, dioxide silicon doped with boson or phosphorus, and organic compounds on the planar waveguide 400 by, for example, sputtering, and cutting the high-refractive material using, for example, a photolithography technology, to form an odd number of media strips 510. Alternatively, the media grating 500 can be formed by lithium niobate diffused with titanium.

Each of the second electrodes 600 is as long as or slightly longer than and is as high as or slightly higher than each of the first media strips 510. The second electrodes 600 can be formed by, for example, coating metal such as copper on the first surface 110.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A polarization splitter, comprising:
   a substrate made of a birefringence crystal and comprising a first surface;
   an asymmetric Y-shaped waveguide formed into the first surface and comprising an input section for transmitting both transverse electric wave and transverse magnetic wave, a first branch for only transmitting the transverse electric wave, and a second branch for only transmitting the transverse magnetic wave, the first branch and the second branch branching off the input section;
   a pair of strip-shaped first electrodes positioned on the first surface, arranged at two opposite sides of the input section and substantially parallel with a central axis of the input section;
   a planar waveguide formed into the first surface and connecting an end of the input section opposite to the first branch, the planar waveguide being configured to receive a laser beam traversing substantially along the central axis and toward the input section;
   a media grating formed on the planar waveguide and is symmetrical about the central axis; and
   a pair of strip-shaped second electrodes positioned on the planar waveguide, at two opposite sides of the media grating and substantially parallel with the central axis.

2. The polarization splitter of claim 1, wherein the planar waveguide is made of lithium niobate.

3. The polarization splitter of claim 1, wherein the substrate comprises a second surface perpendicularly connecting the first surface and substantially perpendicular to the central axis, and the planar waveguide extends from the input section to the second surface, the laser beam is emitted by a laser light source, which is a distributed feedback laser, and is attached to a part of the second surface that corresponds to the planar waveguide and aligns with the entrance of the input section.

4. The polarization splitter of claim 1, wherein the media grating film is made of material selected from the group consisting of dioxide silicon, dioxide silicon doped with boson, dioxide silicon doped with phosphorus, and organic compounds.

5. The polarization splitter of claim 1, wherein the media grating is made of lithium niobate diffused with titanium.

6. The polarization splitter of claim 1, wherein the media grating is a chirped grating.

7. The polarization splitter of claim 1, wherein the media grating comprises an odd number of media strips extending along a direction that is substantially parallel with the central axis, each of the media strips is rectangular, in this order from the widthwise center to each widthwise side of the media grating, widths of the media strips decrease, and widths of gaps between each two adjacent media strips also decrease.

8. The polarization splitter of claim 1, wherein a coordinate axis "ox" is established, wherein the origin "o" is an intersecting point of the central axis and a widthwise direction of the planar waveguide, and "x" axis is the widthwise direction of the planar waveguide, boundaries of the media strips are set to conform condition formulae:

$$x_n = \sqrt{\frac{\ln\left(1 - \frac{n\pi}{a}\right)}{k}},$$

and $x_n>0$, wherein $x_n$ is the nth boundary of the media strips along the "x" axis, and a, e, and k are constants.

* * * * *